US008869502B2

(12) United States Patent
Kim et al.

(10) Patent No.: US 8,869,502 B2
(45) Date of Patent: Oct. 28, 2014

(54) FUEL REFORMER SYSTEM FOR A TURBOMACHINE SYSTEM

(75) Inventors: Kihyung Kim, Mauldin, SC (US); Hasan Karim, Simpsonville, SC (US); Abdul Rafey Khan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 960 days.

(21) Appl. No.: 13/005,790

(22) Filed: Jan. 13, 2011

(65) Prior Publication Data

US 2012/0180497 A1 Jul. 19, 2012

(51) Int. Cl.
*F02B 43/00* (2006.01)
*F22B 37/24* (2006.01)
*F01K 23/10* (2006.01)

(52) U.S. Cl.
CPC ............... *F22B 37/248* (2013.01); *F01K 23/10* (2013.01); *Y02E 20/16* (2013.01)
USPC ....... 60/39.12; 60/780; 60/39.461; 60/39.465

(58) Field of Classification Search
CPC .............. F02C 3/28; F02C 6/18; F01K 23/10; Y02E 20/16; F23R 3/40; F22B 1/1815
USPC ........... 60/780, 39.12, 777, 723, 39.822, 299, 60/39.812, 736, 801, 784, 39.465, 39.461
See application file for complete search history.

(56) References Cited

U.S. PATENT DOCUMENTS

| | | | | |
|---|---|---|---|---|
| 5,048,284 | A | 9/1991 | Lywood et al. | |
| 5,595,059 | A * | 1/1997 | Huber et al. | 60/780 |
| 5,729,967 | A | 3/1998 | Joos et al. | |
| 5,873,236 | A * | 2/1999 | Koyama et al. | 60/39.12 |
| 5,904,040 | A | 5/1999 | Hums et al. | |
| 5,937,632 | A * | 8/1999 | Dobbeling et al. | 60/777 |
| 6,269,625 | B1 * | 8/2001 | Dibble et al. | 60/777 |
| 7,150,143 | B2 * | 12/2006 | Schick et al. | 60/39.38 |
| 7,802,434 | B2 * | 9/2010 | Varatharajan et al. | 60/780 |
| 2011/0023498 | A1 * | 2/2011 | De Koeijer et al. | 60/780 |
| 2012/0204573 | A1 * | 8/2012 | Draper et al. | 60/780 |
| 2013/0305738 | A1 * | 11/2013 | Hughes et al. | 60/780 |

* cited by examiner

*Primary Examiner* — William H Rodriguez
(74) *Attorney, Agent, or Firm* — Cantor Colburn LLP

(57) ABSTRACT

A turbomachine system includes a compressor portion having a compressor inlet and a compressor outlet, a turbine portion operatively connected to the compressor portion, a combustor having a combustor inlet fluidly connected to the compressor outlet and a combustor outlet fluidly connected to the turbine portion; and a reformer having a reformer inlet fluidly connected to the compressor outlet and a reformer outlet fluidly connected to the combustor inlet. The reformer partially combusts air from the compressor portion and a fuel to form a hydrogen-rich syngas.

14 Claims, 3 Drawing Sheets

2
13
12
10
18
11
15
7
4
6
17
44
42
40
46
30
32
50
48
36
40
37
34
23
24
22

FUEL REFORMER SYSTEM FOR A TURBOMACHINE SYSTEM

BACKGROUND OF THE INVENTION

The subject matter disclosed herein relates to the art of turbomachines and, more particularly, to a fuel reformer system for a turbomachine.

In general, gas turbine engines combust a fuel/air mixture that releases heat energy to form a high temperature gas stream. The high temperature gas stream is channeled to a turbine via a hot gas path. The turbine converts thermal energy from the high temperature gas stream to mechanical energy that rotates a turbine shaft. The turbine may be used in a variety of applications, such as for providing power to a pump or an electrical generator.

In a gas turbine, engine efficiency increases as combustion gas stream temperatures increase. Unfortunately, higher gas stream temperatures produce higher levels of nitrogen oxide (NOx), an emission that is subject to both federal and state regulation. Therefore, there exists a careful balancing act between operating gas turbines in an efficient range, while also ensuring that the output of NOx remains below mandated levels. Various methods exist for achieving low NOx levels. For example, ensuring good mixing of fuel and air prior to combustion will lead to lower emissions. Other methods include modifying exhaust stacks to collect pollutants or using exhaust gas recirculation systems to scrub pollutants from the exhaust.

BRIEF DESCRIPTION OF THE INVENTION

According to one aspect of the invention, a turbomachine system includes a compressor portion having a compressor inlet and a compressor outlet, a turbine portion operatively connected to the compressor portion, a combustor having a combustor inlet fluidly connected to the compressor outlet and a combustor outlet fluidly connected to the turbine portion; and a reformer having a reformer inlet fluidly connected to the compressor outlet and a reformer outlet fluidly connected to the combustor inlet. The reformer partially combusts air from the compressor portion and a fuel to form a hydrogen-rich syngas.

According to another aspect of the invention, a method of reforming fuel for a turbomachine system includes passing compressed air from a compressor portion to a reformer, passing fuel to the reformer, reforming the fuel by partially combusting the compressed air and fuel to form a hydrogen-rich sysgas, and guiding the hydrogen-rich syngas to a combustor fluidly connecting the compressor portion and a turbine portion.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
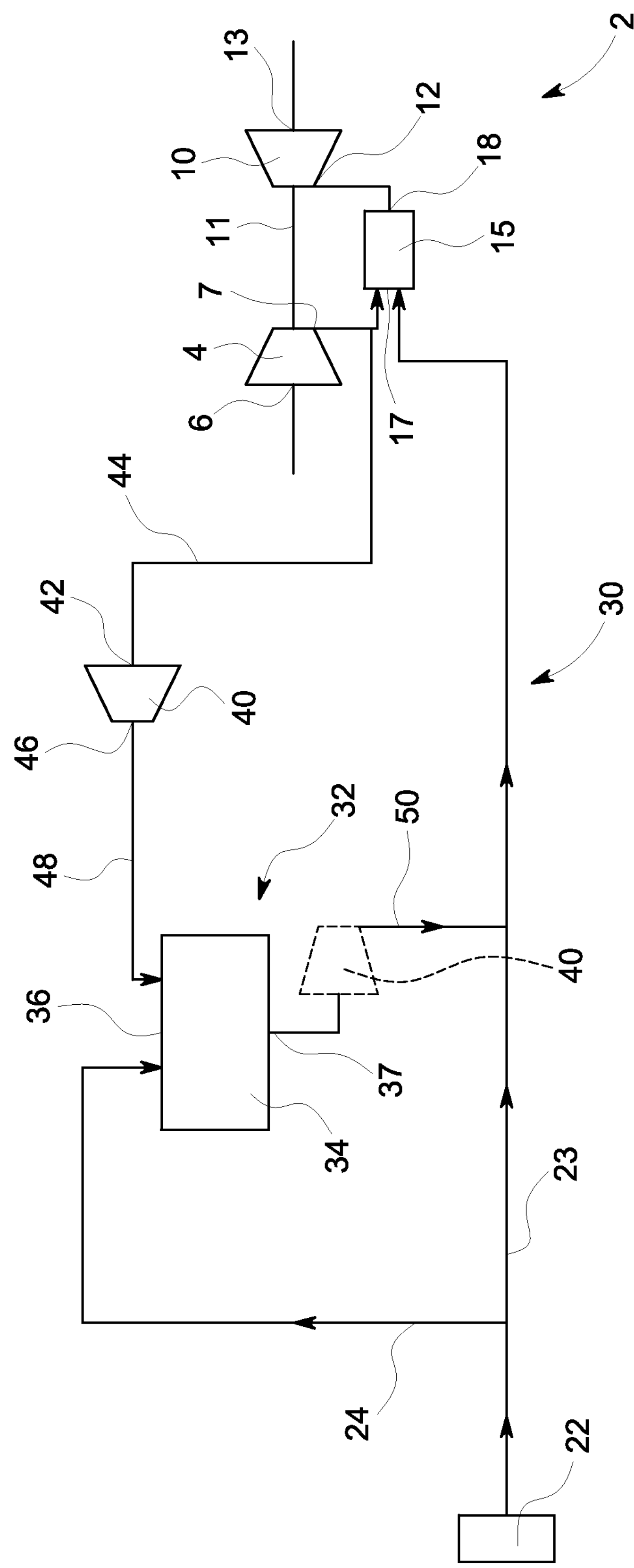
FIG. 1 is a schematic diagram illustrating a turbomachine system including a fuel reformer system in accordance with one aspect of an exemplary embodiment.

With reference to FIG. 1, a turbomachine system in accordance with an exemplary embodiment is indicated generally at 2. Turbomachine system 2 includes a compressor portion 4 having a compressor inlet 6 and a compressor outlet 7. Compressor portion 4 is operatively connected to a turbine portion 10 through a common compressor/turbine shaft 11. Turbine portion 10 includes a turbine inlet 12 that receives combustion gases as will be detailed more fully below, and a turbine outlet 13. Turbine outlet 13 provides power to a powered component such as a generator, pump or the like. Compressor portion 4 is also linked to turbine portion 10 through a combustor 15. Combustor 15 includes a combustor inlet 17 fluidly connected to compressor outlet 7 and a combustor outlet 18 fluidly connected to turbine inlet 12. Combustor 15 is also fluidly connected to a fuel system 22 that delivers a fuel, such as natural gas, to turbomachine system 2. Fuel system 22 includes a first fuel circuit 23 fluidly connected to combustor inlet 17 and a second fuel circuit 24 fluidly connected to a reformer system 30 as will be discussed more fully below.

Reformer system 30 includes a reformer 32, which in the exemplary embodiment shown, takes the form of a catalytic partial oxidation (CPOX) reformer 34. Of course, it should be understood that other types of reformers could also be employed. CPOX reformer 34 includes a reformer inlet 36 fluidly connected to compressor outlet 6 and a reformer outlet 37 fluidly connected to combustor inlet 17 through first fuel circuit 23. Reformer system 30 also includes a compressor member 40 that raises a pressure of compressed air passing from compressor portion 4 to be at a pressure similar to that of fuel passing through second fuel circuit 24 as will be discussed more fully below. In the exemplary embodiment illustrated in FIG. 1, compressor member 40 includes a compressor member inlet 42 fluidly connected to compressor outlet 6 through a first conduit 44 and a compressor member outlet 46 fluidly connected to reformer inlet 36 through a second conduit 48. A third conduit 50 fluidly connects reformer outlet 37 with combustor inlet 17 through first fuel circuit 23. Alternatively, compressor member 40 could be fluidly connected between reformer outlet 37 and combustor inlet 17 as shown. In either case, CPOX reformer 34 combusts air from compressor portion 4 and fuel from fuel system 22 to form a hydrogen-rich syngas that is introduced into combustor 15. The hydrogen-rich or $H_2$ doped syngas is mixed with additional fuel passed through first fuel circuit 23 to form a combustible mixture used to power turbine portion 10.

In accordance with one aspect of the exemplary embodiment, compressed air exits compressor outlet 7 at about 130~230 psi (9.14~16.17 kgf/cm2) and about 650~750° F. (343.3~398.9° C.). The compressed air passes through combustor member 40 and is further compressed to about 250~400 psi (17.58~28.12 kgf/cm2) prior to entering reformer 32. At the same time, fuel passes from fuel system 22 at a pressure of about 250~400 psi (17.58~28.12 kgf/cm2) and about 350~410° F. (176.7~210° C.). The fuel enters reformer 32 and mixes with the compressed air. The fuel and compressed air are partially combusted in the presence of a catalyst to form a hydrogen-rich syngas that passes from reformer 32 at a slightly lower pressure than inlet fuel pressure. The hydrogen-rich syngas enters first fuel circuit 23 upstream from combustor 15 to form a combustible hydrogen-rich syngas including about 5~20% hydrogen. The combustible mixture is ignited to form products of combustion that are passed to turbine portion 10. The addition of the hydrogen-rich syngas reduces emissions from turbomachine system 2. In accordance with one aspect of the exemplary embodiment, emissions, such as NOx can be reduced to a level that is below 3 ppm. Reducing emissions in this manner leads to a reduction in operating costs as compared to reducing NOx emissions through selective catalytic reduction (SCR). In certain cases a seventy-percent or better savings in operational costs, and about 50% of initial investment cost saving can be achieved through the use of Hydrogen-rich syngas formed in reformer 32 as compared to SCR.

Figure 2:
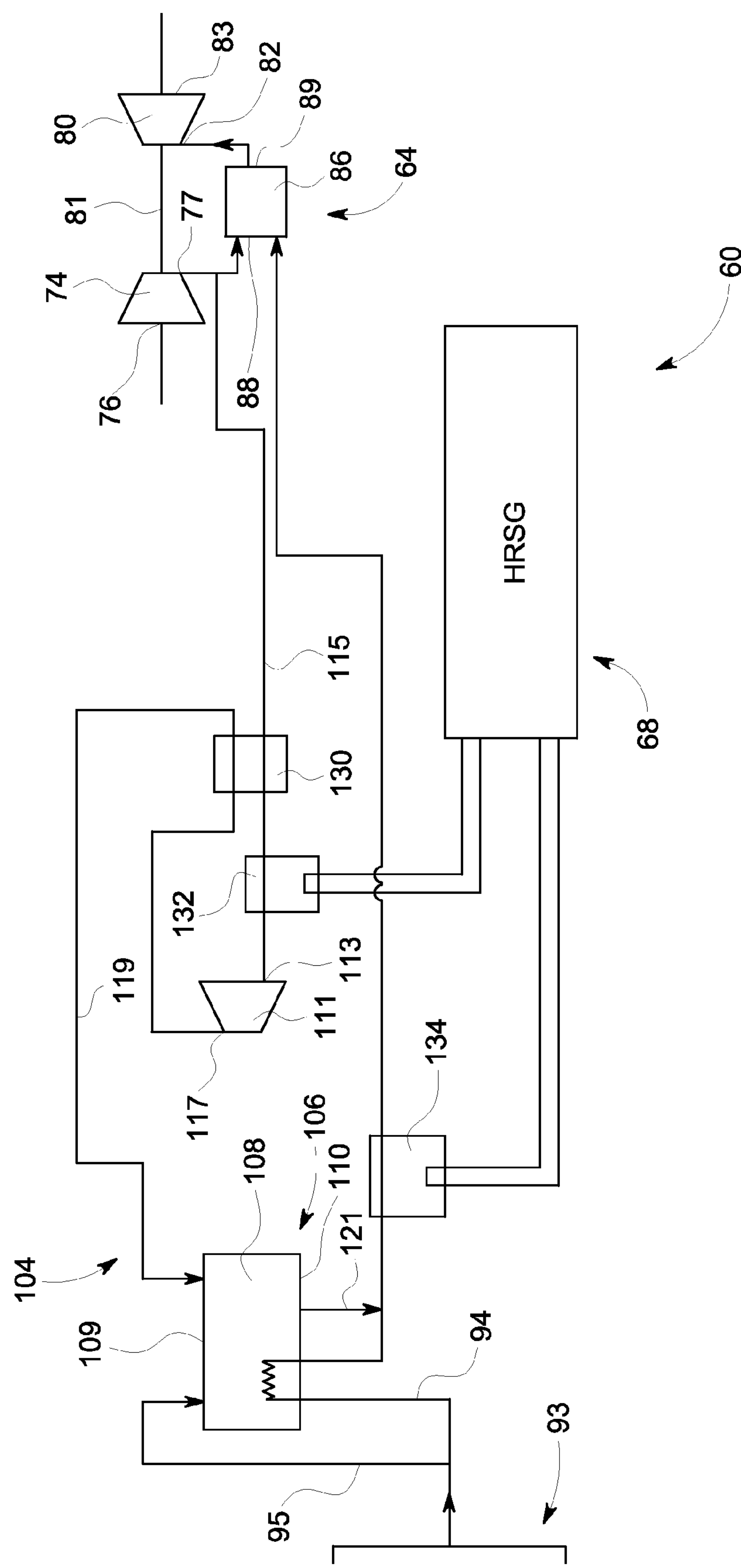
FIG. 2 is a schematic diagram illustrating a turbomachine system including a fuel reformer system in accordance with another aspect of the exemplary embodiment.

Reference will now be made to FIG. 2 in describing a combined cycle power plant (CCPP) 60 in accordance with another aspect of the exemplary embodiment. CCPP 60 includes a gas turbomachine system 64 operatively coupled to a heat recovery steam generator 68. Although not shown, HRSG 68 is also operatively coupled to a steam turbomachine system. In a manner similar to that described above, turbomachine system 64 includes a compressor portion 74 having a compressor inlet 76 and a compressor outlet 77. Compressor portion 74 is operatively connected to a turbine portion 80 through a common compressor/turbine shaft 81. Turbine portion 80 includes a turbine inlet 82 that receives combustion gases, and a turbine outlet 83. Compressor portion 74 is also linked to turbine portion 80 through a combustor 86. Combustor 86 includes a combustor inlet 88 fluidly connected to compressor outlet 77 and a combustor outlet 89 fluidly connected to turbine inlet 82. Combustor 86 is also fluidly connected to a fuel system 93. Fuel system 93 includes a first fuel circuit 94 fluidly connected to combustor inlet 88 and a second fuel circuit 95 fluidly connected to a reformer system 104 as will be discussed more fully below.

Reformer system 104 includes a reformer 106, which in the exemplary embodiment shown, takes the form of a catalytic partial oxidation (CPOX) reformer 108. Of course, it should be understood that other types of reformers could also be employed such as a steam reformer and an auto-thermal reformer. CPOX reformer 108 includes a reformer inlet 109 fluidly connected to compressor outlet 77 and a reformer outlet 110 fluidly connected to combustor inlet 88. Reformer system 104 also includes a compressor member 111 that raises a pressure of compressed air passing from compressor portion 74 to a pressure similar to that of a pressure of fuel passing through second fuel circuit 95 as will be discussed more fully below.

In the exemplary embodiment illustrated in FIG. 2, compressor member 111 includes a compressor member inlet 113 fluidly connected to compressor outlet 77 through a first conduit 115 and a compressor member outlet 117 fluidly connected to reformer inlet 109 through a second conduit 119. A third conduit 121 fluidly connects reformer outlet 110 with combustor inlet 88 through first fuel circuit 94. In a manner similar to that described above, CPOX reformer 108 partially combusts air from compressor portion 74 and fuel from fuel system 93 to form a hydrogen-rich syngas that is introduced into combustor 86. The hydrogen-rich or $H_2$ doped syngas is mixed with additional fuel passed through first fuel circuit 94 to form a combustible mixture used to power turbine portion 80.

In further accordance with the exemplary embodiment shown, reformer system 104 includes a first heat exchange member 130 operatively connected between first conduit 115 and second conduit 119. Heat exchange member 130 extracts a portion of heat entrained within the compressed air passing from compressor section 74 and re-introduces a portion of the heat back into the compressed air passing from compressor member 111. Reformer system 104 is also shown to include a second heat exchange member 132 arranged within first conduit 115 downstream from first heat exchange member 130. Second heat exchange member 132 removes another portion of heat entrained within the compressed air exiting first heat exchange member 130. In the exemplary embodiment shown, heat removed at second heat exchange member 132 is employed to recover the energy through HRSG 68. In this manner, first and second heat exchanger members 130 and 132 condition the compressed air prior to entry into compressor member 111 such that compressor member 111 is not exposed to compressed air at high temperatures. That is, by lowering a temperature of the compressed air passing from compressor portion 74, it is not necessary to employ costly materials and production processes that would otherwise be required to ensure that compressor member 111 would be capable of withstanding higher temperatures.

In addition, a third heat exchange member 134 is arranged in first fuel circuit 94 downstream from reformer outlet 110. Third heat exchange member 134 passes the fuel/hydrogen-rich syngas or combustible mixture in a heat exchange relationship with a working fluid passing to HRSG 68. More specifically, third heat exchange member 134 lowers a temperature of the combustible mixture flowing to combustor 86. To further enhance mixing, the fuel flowing through first fuel circuit 94 is initially cooled by passing in a heat exchange relationship with reformer 106. In this manner, the fuel/hydrogen-rich syngas from reformer 106 and fuel passing through first fuel circuit 94 are at substantially similar temperatures to enhance mixing and to minimize thermal stress at the mixing point pipe line.

With this arrangement, not only does reformer system 104 lower NOx emissions through the addition of hydrogen-rich syngas, but also incorporates heat exchanger members that maintain compressed air, fuel, and syngas temperatures at desired levels which eliminate the need for costly materials and allow the use of existing components. In addition to maintaining desired compressed air, fuel and syngas temperatures, the heat exchange members enhance operational efficiency of CCPP 60 by reducing heat loss. That is, instead of expunging the heat from the compressed air, fuel and syngas to ambient, the heat is employed to raise temperatures of working fluid(s) that pass through HRSG 68.

Figure 3:
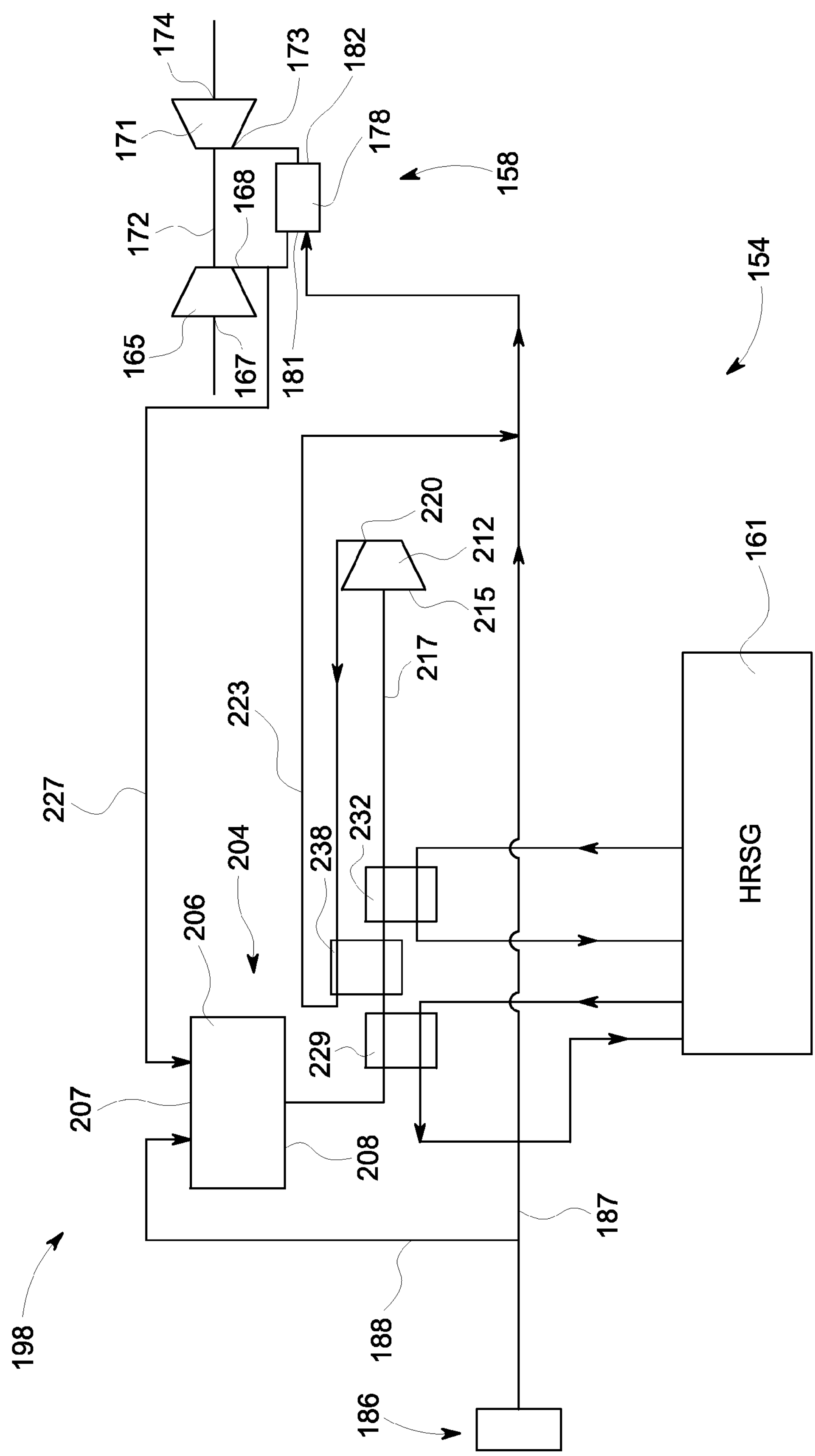
FIG. 3 is a schematic diagram illustrating a turbomachine system including a fuel reformer system in accordance with yet another aspect of the exemplary embodiment.

Reference will now be made to FIG. 3 in describing a combined cycle power plant (CCPP) 154 constructed in accordance with yet another exemplary embodiment. CCPP 154 includes a gas turbomachine system 158 operatively coupled to a heat recovery steam generator 161. Although not shown, HRSG 161 is also operatively coupled to a steam turbomachine system. In a manner similar to that described above, turbomachine system 154 includes a compressor portion 165 having a compressor inlet 167 and a compressor outlet 168. Compressor portion 165 is operatively connected to a turbine portion 171 through a common compressor/turbine shaft 172. Turbine portion 171 includes a turbine inlet 173 that receives combustion gases, and a turbine outlet 174. Compressor portion 165 is also linked to turbine portion 171 through a combustor 178. Combustor 178 includes a combustor inlet 181 fluidly connected to compressor outlet 168 and a combustor outlet 182 fluidly connected to turbine inlet 173.

Combustor 178 is also fluidly connected to a fuel system 186. Fuel system 186 includes a first fuel circuit 187 fluidly connected to combustor inlet 181 and a second fuel circuit 188 fluidly connected to a reformer system 198 as will be discussed more fully below.

Reformer system 198 includes a reformer 204, which in the exemplary embodiment shown, takes the form of a catalytic partial oxidation (CPOX) reformer 206. Of course, it should be understood that other types of reformers could also be employed. CPOX reformer 206 includes a reformer inlet 207 fluidly connected to compressor outlet 168 and a reformer outlet 208 fluidly connected to combustor inlet 181. Reformer system 198 also includes a compressor member 212 that raises a pressure of a hydrogen-rich syngas passing from reformer 204 to a pressure similar to that of fuel passing through first fuel circuit 187.

In the exemplary embodiment illustrated in FIG. 3, compressor member 212 includes a compressor member inlet 215 fluidly connected reformer outlet 208 through a first conduit 217 and a compressor member outlet 220 fluidly connected to combustor inlet 181 through a second conduit 223. A third conduit 227 fluidly connects reformer inlet 207 with compressor outlet 168. In a manner similar to that described above, CPOX reformer 108 combusts air from compressor portion 74 and fuel from fuel system 186 to form a hydrogen-rich syngas that is mixed with additional fuel passed through first fuel circuit 187 to form a combustible mixture that is passed to combustor 178 and used to power turbine portion 171.

In further accordance with the exemplary embodiment shown, reformer system 198 includes a series of heat exchange members that are configured to lower a temperature of the hydrogen-rich syngas to a temperature that is readily supported by compressor member 212. More specifically, reformer system 198 includes a first heat exchange member 229 fluidly connected to reformer outlet 208. First heat exchange member 229 extracts a first portion of heat entrained within the hydrogen-rich syngas. The first portion of heat extracted from the hydrogen-rich syngas is utilized to raise a temperature of working fluid passing from HRSG 161. In accordance with one aspect of the exemplary embodiment, the working fluid is heated to a point of vaporization. A second heat exchange member 232 is arranged downstream from first heat exchange member 229. Second heat exchange member 232 extract additional heat from the hydrogen-rich syngas to control conditions at compressor member inlet 215. The additional heat is utilized to heat working fluid in HRSG 161. In addition, a third heat exchange member 238 is arranged between first conduit 217 and second conduit 223. Third heat exchange member 238 extracts additional heat from the hydrogen-rich syngas passing though first conduit 217 and re-introduces a portion of the extracted heat back into the hydrogen-rich syngas exiting compressor member 212. In this manner, third heat exchange member 238 returns the hydrogen-rich syngas to a temperature that approximates a temperature of the fuel passing through first fuel conduit 187.

In a manner similar to that discussed above, not only does reformer system 198 lower NOx emissions through the addition of hydrogen-rich syngas, but also incorporates heat exchangers which maintain syngas temperatures at desired levels in order to allow use of existing components. In addition to maintaining desired syngas temperatures, the heat exchange members enhance operational efficiency of CCPP 154 by reducing heat loss. That is, instead of expunging the heat from the syngas to ambient, the heat is employed to raise temperatures of working fluid(s) that pass through HRSG 161.

At this point it should be understood that the above described temperatures and pressures could vary depending upon system configuration. In addition, it should be understood that the above described systems may also include a number of pressure regulating devices, control valves and the like that moderate fluid flow to and from the reformer. Finally, it should be understood that the particular type and operation of the reformer can vary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine system comprising:
- a compressor portion having a compressor inlet and a compressor outlet;
- a turbine portion operatively connected to the compressor portion;
- a combustor having a combustor inlet fluidly connected to the compressor outlet and a combustor outlet fluidly connected to the turbine portion;
- a reformer having a reformer inlet fluidly connected to the compressor outlet and a reformer outlet fluidly connected to the combustor inlet, the reformer partially combusting air from the compressor portion and a fuel to form a hydrogen-rich syngas;
- a fuel system having a first fuel circuit fluidly connected to the reformer inlet and a second fuel circuit fluidly connected to the combustor inlet, wherein the second fuel circuit is in a thermally conductive heat exchange relationship with the reformer;
- a compressor member having a compressor member inlet fluidly connected to the compressor outlet and a compressor member outlet fluidly connected to the reformer inlet; and
- a first heat exchange member fluidly connected between the compressor outlet and compressor member inlet, and the compressor member outlet and the reformer inlet.

2. The turbomachine system according to claim 1, wherein the reformer comprises a catalytic partial oxidation (CPDX) system.

3. The turbomachine system according to claim 1, further comprising: a second heat exchange member fluidly connected between the compressor outlet and the compressor member inlet.

4. The turbomachine system according to claim 3, further comprising: a heat recovery steam generator fluidly connected to the second heat exchange member.

5. The turbomachine system according to claim 1, further comprising: a heat exchange member fluidly connected between the reformer outlet and the combustor inlet.

6. The turbomachine system according to claim 5, further comprising: a heat recovery steam generator fluidly connected to the heat exchange member.

7. The turbomachine system according to claim 1, further comprising: a compressor member having a compressor member inlet fluidly connected to the reformer outlet and a compressor member outlet fluidly connected to the combustor inlet.

8. The turbomachine system according to claim 7, further comprising: at least one heat exchange member fluidly connected between the reformer outlet and the compressor member inlet.

9. The turbomachine system according to claim 8, wherein the at least one heat exchange member includes a plurality of heat exchange members fluidly connected between the reformer outlet and the compressor member inlet.

10. The turbomachine system according to claim 8, further comprising: a heat recovery steam generator fluidly connected to the at least one heat exchange member.

11. The turbomachine system according to claim 7, further comprising: a heat exchange member fluidly connected between the reformer outlet and the compressor member inlet, and the compressor member outlet and the combustor inlet.

12. A method of reforming fuel for a turbomachine system, the method comprising:

passing compressed air from a compressor portion to a reformer;

passing fuel in a first fuel circuit to the reformer;

reforming the fuel by partially combusting the compressed air and fuel to form a hydrogen-rich syngas;

passing fuel in a second fuel circuit in a thermally conductive heat exchange relationship with the reformer;

guiding the hydrogen-rich syngas to a combustor fluidly connecting the compressor portion and a turbine portion;

extracting heat from one of the compressed air passing to the reformer and the syngas passing to the combustor into a heat exchange member; and passing a fluid in thermally conductive heat exchange relationship with the heat exchange member to a heat recovery steam generator.

13. The method of claim 12, wherein the compressed air and fuel is partially combusted in presence of a catalyst.

14. The method of claim 12, further comprising: further compressing the compressed air passing from the compressor portion to the reformer.

* * * * *